United States Patent
Beeken et al.

(10) Patent No.: US 8,719,523 B2
(45) Date of Patent: *May 6, 2014

(54) MAINTAINING MULTIPLE TARGET COPIES

(75) Inventors: Christopher B. Beeken, Winchester (GB); William J. Scales, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 90 days.

This patent is subject to a terminal disclaimer.

(21) Appl. No.: 13/251,867

(22) Filed: Oct. 3, 2011

(65) Prior Publication Data

US 2013/0086342 A1 Apr. 4, 2013

(51) Int. Cl.
*G06F 12/00* (2006.01)
*G06F 3/06* (2006.01)

(52) U.S. Cl.
USPC ............................................. 711/162; 711/112

(58) Field of Classification Search
None
See application file for complete search history.

(56) References Cited

U.S. PATENT DOCUMENTS

| | | | |
|---|---|---|---|
| 5,210,866 A | 5/1993 | Milligan et al. | |
| 5,526,506 A * | 6/1996 | Hyatt | 711/111 |
| 5,602,999 A * | 2/1997 | Hyatt | 711/1 |
| 6,202,085 B1 | 3/2001 | Benson et al. | |
| 6,557,089 B1 * | 4/2003 | Reed et al. | 711/162 |
| 6,594,744 B1 | 7/2003 | Humlicek et al. | |
| 6,772,302 B1 * | 8/2004 | Thompson | 711/162 |
| 6,876,589 B2 * | 4/2005 | LaBerge | 365/200 |
| 7,188,272 B2 | 3/2007 | Bartfai et al. | |
| 7,191,304 B1 * | 3/2007 | Cameron et al. | 711/202 |
| 7,360,048 B2 | 4/2008 | Agombar et al. | |
| 7,376,676 B2 * | 5/2008 | Blea et al. | 1/1 |
| 7,386,695 B2 | 6/2008 | Fuente | |
| 7,467,268 B2 * | 12/2008 | Lindemann et al. | 711/162 |
| 7,509,523 B2 | 3/2009 | Agombar et al. | |

(Continued)

FOREIGN PATENT DOCUMENTS

| | | |
|---|---|---|
| CA | 2 593 289 | 8/2006 |
| CN | 1702627 | 11/2005 |

(Continued)

OTHER PUBLICATIONS

U.S. Appl. No. 13/466,783, filed May 8, 2012 entitled "Maintaining Multiple Target Copies" invented by Christopher B. Beeken et al., pp. 1-32.

(Continued)

*Primary Examiner* — Tuan Thai
*Assistant Examiner* — Mohamed Gebril
(74) *Attorney, Agent, or Firm* — Janaki K. Davda; Konrad, Raynes, Davda & Victor LLP

(57) ABSTRACT

Provided are techniques for maintaining instant virtual copies. A request to perform an instant virtual copy operation to create an instant virtual copy from a first volume to a new volume is received. It is determined that the first volume has not been modified since a last instant virtual copy operation has been performed. It is determined whether an intermediate volume and an intermediate map have already been created. In response to determining that the intermediate volume and the intermediate map have not already been created, the intermediate volume and the intermediate map are created, the intermediate volume is made dependent on the first volume in a dependency chain based on the intermediate map, and the new volume is made dependent on the intermediate volume in the dependency chain.

14 Claims, 7 Drawing Sheets

(56) References Cited

U.S. PATENT DOCUMENTS

| | | | |
|---|---|---|---|
| 7,546,428 B1 | 6/2009 | McAndrews et al. | |
| 7,571,292 B2* | 8/2009 | McClure | 711/162 |
| 7,676,641 B2 | 3/2010 | Agombar et al. | |
| 7,725,436 B1 | 5/2010 | Park | |
| 7,793,144 B2 | 9/2010 | Agombar et al. | |
| 7,930,496 B2* | 4/2011 | Kubo et al. | 711/162 |
| 8,095,754 B2* | 1/2012 | McBride et al. | 711/162 |
| 8,095,755 B2* | 1/2012 | Ashour et al. | 711/162 |
| 8,230,185 B2* | 7/2012 | Agombar et al. | 711/162 |
| 8,281,093 B1* | 10/2012 | Krishnan et al. | 711/162 |
| 8,356,150 B2* | 1/2013 | Fachan et al. | 711/162 |
| 2004/0006664 A1* | 1/2004 | Helzer et al. | 711/5 |
| 2004/0260902 A1* | 12/2004 | Stanley et al. | 711/165 |
| 2005/0071708 A1* | 3/2005 | Bartfai et al. | 714/5 |
| 2005/0278391 A1 | 12/2005 | Spear et al. | |
| 2006/0015696 A1* | 1/2006 | Nguyen et al. | 711/162 |
| 2006/0112244 A1 | 5/2006 | Buah et al. | |
| 2006/0139697 A1 | 6/2006 | Fuente | |
| 2006/0174074 A1 | 8/2006 | Banikazemi et al. | |
| 2006/0179061 A1 | 8/2006 | D'Souza et al. | |
| 2007/0061531 A1 | 3/2007 | Bartfai et al. | |
| 2007/0294493 A1 | 12/2007 | Buah et al. | |
| 2008/0084769 A1* | 4/2008 | RaghuRam et al. | 365/191 |
| 2008/0114951 A1 | 5/2008 | Lee | |
| 2008/0189482 A1* | 8/2008 | Fuente | 711/112 |
| 2008/0215837 A1 | 9/2008 | Agombar et al. | |
| 2008/0235266 A1 | 9/2008 | Huang et al. | |
| 2010/0023561 A1 | 1/2010 | Zlotnick | |
| 2010/0077160 A1 | 3/2010 | Liu et al. | |
| 2010/0088468 A1* | 4/2010 | Agombar et al. | 711/112 |
| 2011/0208932 A1* | 8/2011 | Agombar et al. | 711/162 |
| 2011/0225380 A1 | 9/2011 | Agombar et al. | |
| 2011/0296127 A1* | 12/2011 | Agombar et al. | 711/162 |
| 2012/0198153 A1* | 8/2012 | Fuente et al. | 711/114 |
| 2012/0221787 A1* | 8/2012 | Fuente et al. | 711/112 |
| 2012/0221824 A1 | 8/2012 | Fuente et al. | |
| 2012/0226879 A1 | 9/2012 | Agombar et al. | |
| 2012/0246427 A1 | 9/2012 | Agombar et al. | |
| 2012/0331264 A1* | 12/2012 | Farrell et al. | 711/207 |

FOREIGN PATENT DOCUMENTS

| | | |
|---|---|---|
| CN | 1794199 | 6/2006 |
| CN | 1828513 | 9/2006 |
| CN | 101093459 | 12/2007 |
| CN | 101120305 | 2/2008 |
| CN | 101997918 | 3/2011 |
| EP | 1645960 | 2/2007 |
| JP | 2008529187 | 7/2008 |
| WO | 2006083327 | 8/2006 |
| WO | 2009009979 | 1/2009 |
| WO | 2010049314 | 5/2010 |
| WO | WO 2010049314 A1 * | 5/2010 |
| WO | 2011036015 | 3/2011 |
| WO | 2011036020 | 3/2011 |

OTHER PUBLICATIONS

Preliminary Amendment dated May 8, 2012, pp. 1-6, for U.S. Appl. No. 13/466,783, filed May 8, 2012, by inventors Christopher B. Beeken et al.

B. Mason, "Deploying Oracle ASM with Oracle 10g RAC on AIX with IBM System Storage DS8000 and DS6000 Advanced Features", IBM Systems and Technology Group, Aug. 2007, San Jose California, 30 pgs. (Also at: http://www.filibeto.org/~aduritz/truetrue/oracle/aix/depl-oracle-asm-DS6_8000-adv.pdf.).

D. Rumney., "Visualizing IBM SAN Volume Controller FlashCopy Mappings", Janurary 22, 2009, 14 pgs. (Also at: : http://www.danrumney.co.uk/papers/visualfcms/visualisefcms.pdf.).

"VCR and FTR", Feature Functions Overview, Mainstar Software Corporation, 2009, 6 pgs. (Also at: http://www.mainstar.com/pdf/vcr-ftr-features.pdf.).

International Search Report and Written Opinion, dated Feb. 28, 2013, for International Application No. PCT/IB2012/055016, filed Sep. 21, 2012, pp. 1-10.

English Abstract of EP1853992 dated Nov. 14, 2007.

English translation of CN101997918 dated Mar. 30, 2011.

Office Action dated Mar. 20, 2013 for U.S. Appl. No. 13/466,783, filed May 8, 2012 entitled "Maintaining Multiple Target Copies", invented by Christopher B. Beeken et al., pp. 1-19.

Response to Office Action, dated Jun. 20, for U.S. Appl. No. 13/466,783, filed May 8, 2012 entitled "Maintaining Multiple Target Copies", invented by Christopher B. Beeken et al., pp. 1-8.

U.S. Appl. No. 13/244,094, filed Sep. 23, 2011 by inventors C.B. Beeken, et al., 50 pages.

U.S. Appl. No. 13/039,245, filed Mar. 2, 2011 by inventors J.P. Agombar, et al., 22 pages.

R. Hou, et a., "Data Replication and Recovery with Dell/EMC SnapView 2.0 and MirrorView", Dell Enterprise Systems, Feb. 2003, pp. 1-23.

W. Xiao, et al., "Case for Continuous Data Protection at Block Level in Disk Array Storages", IEEE Transactions on Parallel and Distributed Systems, vol. 20, No. 6, Jun. 2009, pp. 1-14.

PCT International Search Report dated Sep. 14, 2011 for Application No. PCT/EP2011/057950 filed May 17, 2011.

English abstract of Chinese patent No. CN1794199, published Jun. 28, 2006 by S. Agombar et al.

"Information Materials for IDS" dated Oct. 5, 2011 from Japanese Office Action dated Sep. 20, 2011 for Application No. 2011-533674 filed Oct. 20, 2009, pp. 1-2.

Chinese Office Action dated Nov. 29, 2012 for Serial No. 200980140528.6.

"Information Materials for IDS" dated Dec. 6, 2012 for Chinese Office Action dated Nov. 29, 2012.

English Translation of CN1702627 published Nov. 30, 2005 by IBM Corp.

English Translation of CN1828513 published Sep. 6, 2006 by IBM Corp.

Final Office Action, dated Aug. 1, 2013, for U.S. Appl. No. 13/466,783, filed May 8, 2012, entitled "Maintaining Multiple Target Copies", invented by Christopher B. Beeken et al., pp. 1-36.

Response to Final Office Action, dated Nov. 1, 2013, for U.S. Appl. No. 13/466,783, filed May 8, 2012, entitled "Maintaining Multiple Target Copies", invented by Christopher B. Beeken et al., pp. 1-8.

Notice of Allowance, dated Nov. 20, 2013, for U.S. Appl. No. 13/466,783, filed May 8, 2012, entitled "Maintaining Multiple Target Copies", invented by Christoper B. Beeken et al., pp. 1-14.

* cited by examiner

MAINTAINING MULTIPLE TARGET COPIES

BACKGROUND

Embodiments of the invention relate to maintaining multiple target copies.

Computing systems often include one or more production computers (for processing data and running application programs, direct access storage devices (DASDs) for storing data, and a storage controller for controlling the transfer of data between the production computers and the DASD. Storage controllers, also referred to as control units or storage directors, manage access to a storage space comprised of numerous hard disk drives connected in a loop architecture, otherwise referred to as a Direct Access Storage Device (DASD). Production computers may communicate Input/Output (I/O) requests to the storage space through the storage controller.

The storage of data in large organizations is important, both for reliability of the data and for the ability to recover data in the event of any hardware failure. Storage Area Network (SAN) is an architecture that is used when very large amounts of data are needed to be stored in a reliable and secure manner. This technology allows networks to be created that support the attachment of remote computer storage devices such as disk arrays to servers in such a way that, to the operating system, the devices appear as locally attached. It is common in these networks to include a large amount of redundancy, both in the data storage and in the hardware connections between the individual components. Various techniques exist for creating data redundancy.

In many systems, a data volume on one storage device, such as a DASD, may be copied to the same or another storage device. A point-in-time copy involves physically copying all the data from source volumes to target volumes so that the target volume has a copy of the data as of a point-in-time. A point-in-time copy can also be made by logically making a copy of the data and then only copying data over when necessary, in effect deferring the physical copying. This logical copy operation is performed to minimize the time during which the target and source volumes are inaccessible.

A number of direct access storage device (DASD) subsystems are capable of performing "instant virtual copy" operations, also referred to as "fast replicate functions." Instant virtual copy operations work by modifying metadata, such as relationship tables or pointers, to treat a source data object as both the original and copy. In response to a production computer's copy request, the storage subsystem immediately reports creation of the copy without having made any physical copy of the data. Only a "virtual" copy has been created, and the absence of an additional physical copy is completely unknown to the production computer.

Later, when the storage system receives updates to the original or copy, the updates are stored separately and cross-referenced to the updated data object only. At this point, the original and copy data objects begin to diverge. The initial benefit is that the instant virtual copy occurs almost instantaneously, completing much faster than a normal physical copy operation. This frees the production computer and storage subsystem to perform other tasks. The production computer or storage subsystem may even proceed to create an actual, physical copy of the original data object during background processing, or at another time.

One such instant virtual copy operation is known as a FLASHCOPY® operation. (FLASHCOPY is a registered trademark or common law mark of International Business Machines Corporation in the United States and/or other countries.) A FLASHCOPY® operation involves establishing a logical point-in-time relationship between source and target volumes on the same or different devices.

Instant virtual copy techniques, such as a FLASHCOPY® operation, provide a point-in-time copy tool. Thus, an instant virtual copy may be described as an instant snapshot of a data set or volume.

For example, a function such as a FLASHCOPY® function enables an administrator to make point-in-time, full volume copies of data, with the copies immediately available for read or write access. The FLASHCOPY® function can be used with standard backup tools that are available in the environment to create backup copies on tape. A FLASHCOPY® function creates a copy of a source volume on a target volume. This copy, as mentioned above, is called a point-in-time copy. When a FLASHCOPY® operation is initiated, a relationship is created between a source volume and target volume. This relationship is a "mapping" of the source volume and the target volume. This mapping allows a point-in-time copy of that source volume to be copied to the associated target volume. The relationship exists between this volume pair from the time that the FLASHCOPY® operation is initiated until the storage unit copies all data from the source volume to the target volume, or the relationship is deleted.

When the data is physically copied, a background process copies tracks from the source volume to the target volume. The amount of time that it takes to complete the background copy depends on various criteria, such as the amount of data being copied, the number of background copy processes that are running and any other activities that are presently occurring. The FLASHCOPY® function works in that the data which is being copied does not actually need to be copied instantaneously, it only needs to be copied just prior to an update causing on overwrite of any old data on the source volume. So, as data changes on the source volume, the original data is copied to the target volume before being overwritten on the source volume.

Therefore, a FLASHCOPY® is a feature supported on various storage devices that allows a user or an automated process to make nearly instantaneous copies of entire logical volumes of data. A copy of a source disk is made on a target disk. The copies are immediately available for both read and write access. A common feature of FLASHCOPY® like implementations is the ability to reverse the copy. That is, to populate the source disk of a FLASHCOPY® map with the contents of the target disk.

Multiple target instant virtual copy is a common copy service feature in storage controllers enabling the user to create many point-in-time images (i.e., instant virtual copies) of a production volume. These volumes may be used for restoring data when there is data corruption or when data has been changed due to test and development activities. The reasons for using such a feature are many and the number copies required is growing. High level features, such as near Continuous Data Protection (CDP) or Golden Image are also available. CDP may be described as a backup of data that automatically saves a copy of every change made to that data. An original version of data (e.g., an application) may be referred to as a Golden Image, and multiple copies may be made from this Golden Image.

Some basic techniques that may be adopted to implement instant virtual copy functionality include copy-on-write and redirect-on-write. Both copy-on-write and redirect-on-write track an image's data.

With one approach to maintaining many images with copy-on-write, the more images that need to be supported, the more overhead in terms of writes required for image maintenance due to production computer write activity to the source or production volume.

SUMMARY

Provided are a method, computer program product, and system for maintaining instant virtual copies. A request to perform an instant virtual copy operation to create an instant virtual copy from a first volume to a new volume is received. It is determined that the first volume has not been modified since a last instant virtual copy operation has been performed. It is determined whether an intermediate volume and an intermediate map have already been created. In response to determining that the intermediate volume and the intermediate map have not already been created, the intermediate volume and the intermediate map are created, the intermediate volume is made dependent on the first volume in a dependency chain based on the intermediate map, and the new volume is made dependent on the intermediate volume in the dependency chain.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
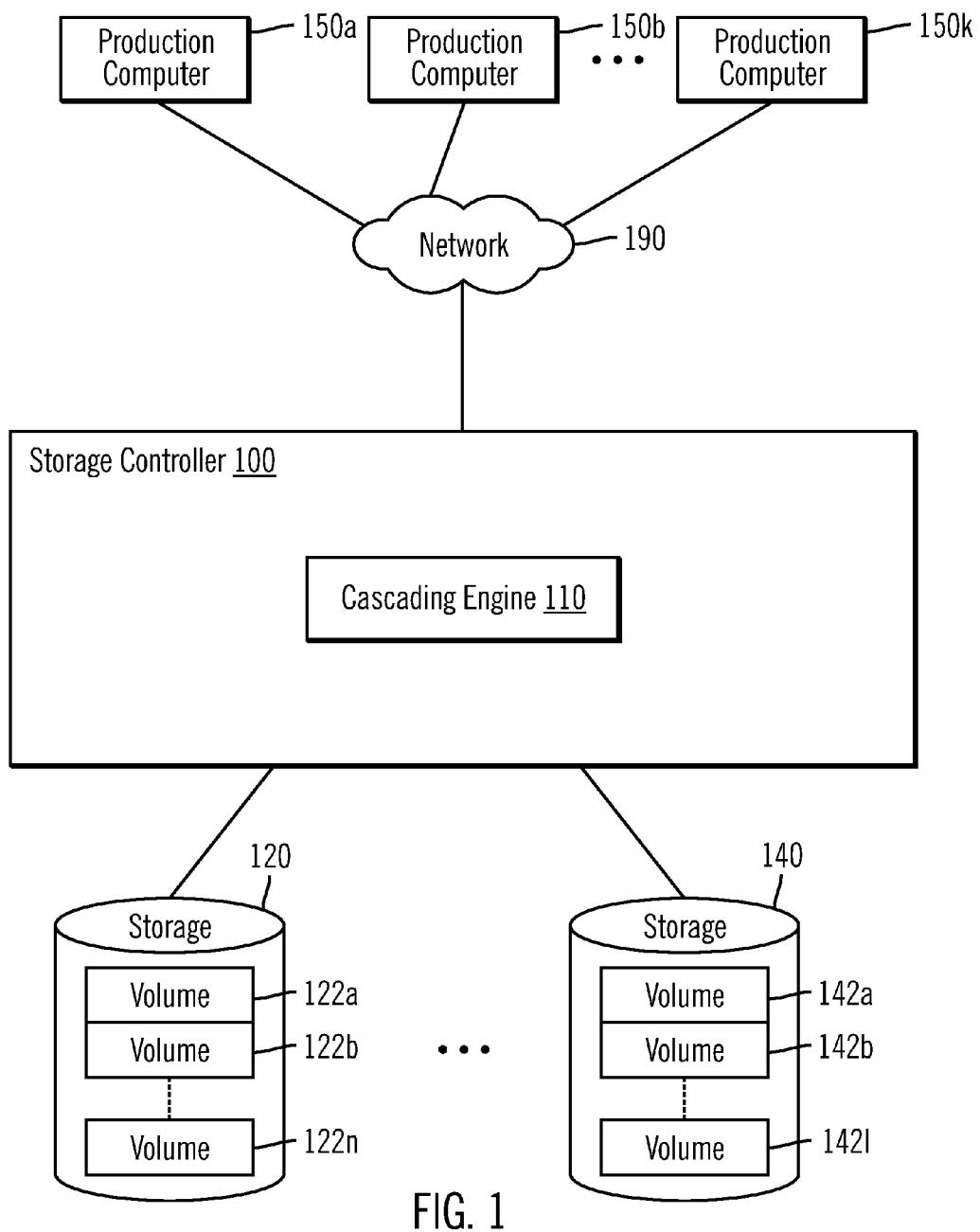
FIG. 1 illustrates, in a block diagram, a computing environment in accordance with certain embodiments.

FIG. 1 illustrates, in a block diagram, a computing environment in accordance with certain embodiments. A storage controller 100 receives Input/Output (I/O) requests from production computers 150$a,b, \ldots k$ (wherein a, b, and k may be any integer value, wherein the ellipses between production computer 150$b$ and production computer 150$k$ indicate that there may be any number of production computers) over a network 190 directed toward storage 120, 140 configured to have volumes (e.g., Logical Unit Numbers, Logical Devices, etc.) 122$a,b \ldots n$, and 142$a,b \ldots l$, respectively, where n and l may be different integer values or the same integer value. The ellipses between storage 120, 140 indicate that there may be any number of storage devices. The storage 120, 140 may be storage devices, such as DASD.

The storage controller 100 further includes a cascading engine 110. The cascading engine 110 performs instant virtual copies of data (e.g., from a production computer 150$a$, 150$b$, 150$k$) to storage 120, 140 or between storage 120, 140. In certain embodiments of the invention, the cascading engine 110 may be executed at another storage controller connected to storage controller 100 instead of, or in addition to, execution at the storage controller 100.

A volume may be any logical or physical element of storage. In certain embodiments, the data blocks are contents of tracks, while the sub-data blocks are contents of sectors of tracks. A volume may be divided into blocks of storage containing data blocks (also referred to as "blocks of data"), and the blocks of storage are further divided into sub-blocks of storage that contain sub-data blocks (also referred to as "sub-blocks of data").

Embodiments of the invention are applicable to the transfer of data between any storage mediums. For example, certain embodiments of the invention may be used with storage mediums located at a single storage controller, as illustrated in FIG. 1. Moreover, certain alternative embodiments of the invention may be used with storage mediums located at different storage controllers, different physical sites, etc. Each storage device may be a source or a target for an instant virtual copy.

In certain embodiments, removable storages (instead of or in addition to storage 120, 140) may be used to maintain copies. The removable storages may reside at the storage controller 100.

The storage controller 100 may further include a processor complex (not shown) and may comprise any storage controller or server known in the art.

The production computers 150$a,b \ldots k$ may comprise any computing device known in the art. The storage controller 100 and production computer system(s) 150$a,b \ldots k$ communicate via a network 190, which may comprise any type of network, such as, a Storage Area Network (SAN), a Local Area Network (LAN), a Wide Area Network (WAN), the Internet, an Intranet, etc. The storage 120, 140 may each comprise an array of storage devices, such as Direct Access Storage Devices (DASDs), Just a Bunch of Disks (JBOD), Redundant Array of Independent Disks (RAID), virtualization device, etc.

Additionally, although FIG. 1 illustrates a single storage controller 100, one skilled in the art would know that multiple storage controllers may be connected via a network (e.g., a Local Area Network (LAN), Wide Area Network (WAN), the Internet, etc.), and one or more of the multiple storage controllers may implement the invention.

An instant virtual copy instruction starts the instant virtual copy process, which creates a map from a source volume to a target volume. The image of the source volume at this specific point in time is now available on the target volume. This creates a backup of the data on the source volume, and also allows tests and other administration tasks to be run on the data of the source volume, without the attendant danger of losing any of the original data, as it is preserved on the original source volume.

When an instant virtual copy is made, it creates a link between the two source and target volumes, as defined by the map. Data may now be copied across in the background, with the additional requirement that any access to the target volume will immediately cause the relevant parts of the image of the source volume to be copied across, and also any access to the source volume which would result in a change to the image stored by that source volume will also cause the unaltered data to be immediately copied across to the target volume. In this way, the target volume, to an outside user, stores the point in time copy of source volume, although data will only be physically copied across under the circumstances described above.

A storage volume that is the target volume of an instant virtual copy function can also be the source volume of a further instant virtual copy function, thus creating a cascade of storage volumes.

Figure 2:
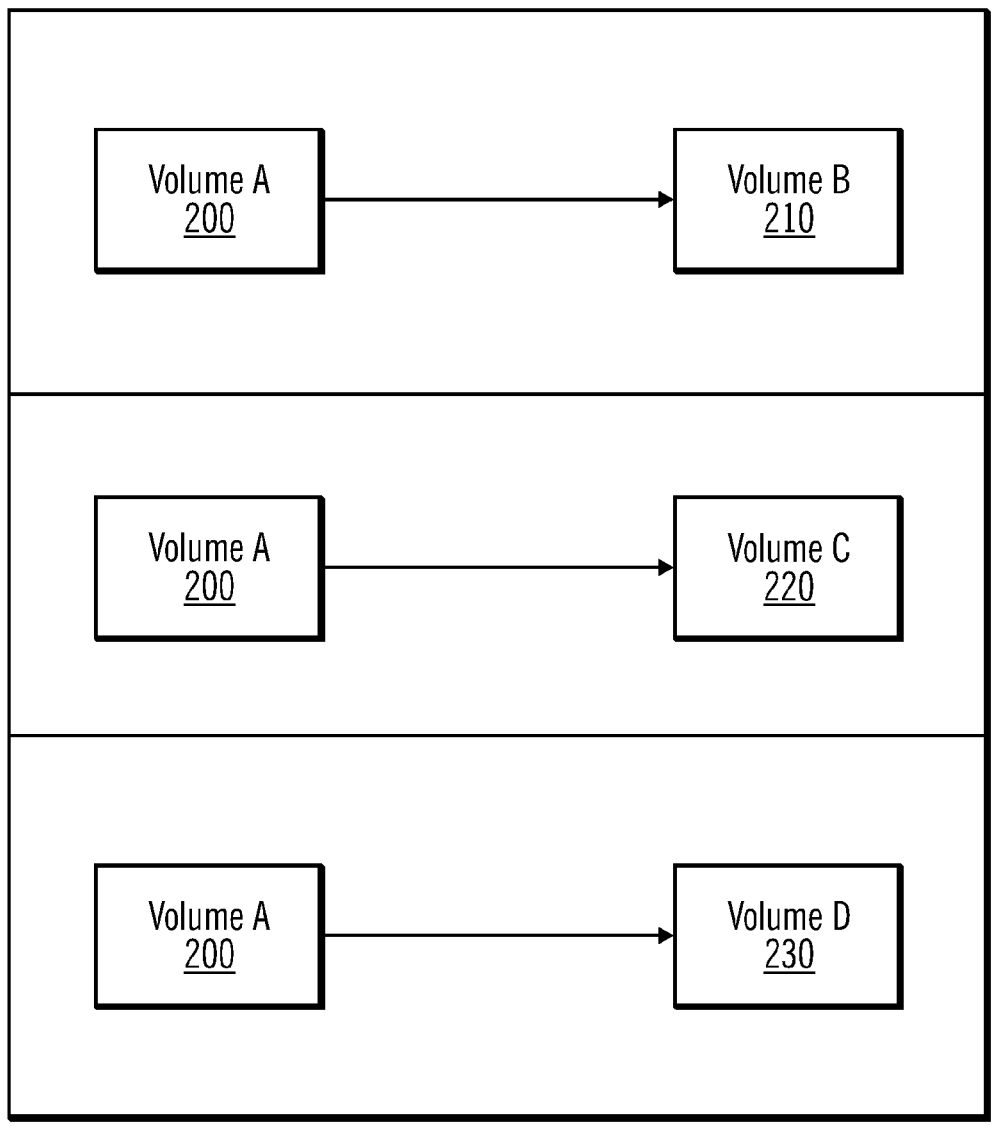
FIG. 2 illustrates, in a block diagram, four volumes (sometimes referred to as vdisks) and mappings between some of the volumes in accordance with certain embodiments.

The cascading engine 110 performs a cascaded approach by creating dependencies between target volumes in order to minimize overhead. FIG. 2 illustrates, in a block diagram, four volumes (sometimes referred to as vdisks) and mappings between some of the volumes in accordance with certain embodiments. In particular, FIG. 2 illustrates volume A 200, volume B 210, volume C 220, and volume D 230. With reference to FIG. 2, the cascading engine 110 creates three instant virtual copy maps 1, 2, 3 defined by:

1:A→B
2:A→C
3:A→D

Figure 3:
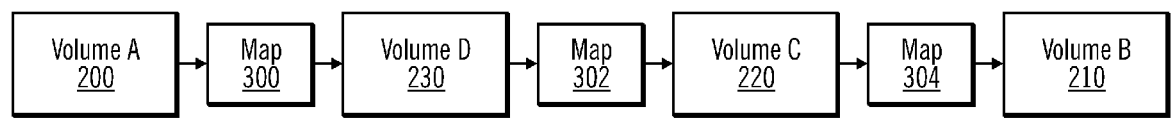
FIG. 3 illustrates, in a block diagram, an example of a cascade of storage volumes, which are linked by respective maps, which each define an instant virtual copy function from a source volume to a target volume, in accordance with certain embodiments.

Starting with these maps 1, 2 and 3, the cascading engine 110 creates a dependency chain of A→D→C→B. FIG. 3 illustrates, in a block diagram, an example of a cascade of storage volumes 200, 230, 220, 210, which are linked by respective maps 300, 302, 304, which each define an instant virtual copy function from a source volume to a target volume, in accordance with certain embodiments. In FIG. 3, volume D 230 is providing a backup of volume A 200, volume C 220 is providing a backup of volume D 230, and volume B 210 is providing a backup of volume C 220. The instant virtual copy functions linking the different storage volumes 200, 210, 220, 230 would have been started at different times, which create different point-in-time copies of the images stored by the respective storage volumes 200, 210, 220, 230.

In the instant virtual copy cascade of A→D→C→B, where A, D, C and B are the volumes in the cascade, shown in FIG. 2, and the arrows are the instant virtual copy maps, then denoting (A, D) to be an instant virtual copy mapping from volume A 200 to volume D 230, the cascade has maps (A, D), (D, C) and (C, B). In this implementation of the cascade, a new data write to volume A 200 can cause a split write to volume D 230, as per the respective instant virtual copy function, which is required to maintain the image on volume D 230.

More complex cascades are possible, particularly when a storage volume is used as the source of more than one instant virtual copy function. For example, a user may wish to carry out two different tests on a current image stored by disk A. The user may initiate instant virtual copy maps A→B and A→E, for example, so that they can perform the individual tests on the disks B and E. If the user then prefers the latter of these two test results, they may initiate the instant virtual copy map E→A to transfer that data back to disk A. Similarly, instant virtual copy reversals that are performed to restore data to an original disk will result in a complicated arrangement of the disks and Instant virtual copy maps.

With reference to FIG. 3, the image presented by each target volume 210, 220, 230 is created by looking first at itself. If that target volume 210, 220, 230 includes the required data, the data is retrieved. If that target volume 210, 220, 230 does not contain the required data, then the cascading engine 110 looks upstream (to the left of the dependency chain in FIG. 3) until the data is found.

If a region of volume A 200 is modified, the original data held in that region is copied to volume D 230, and then the region can be modified. Thus, cascading reduces the overhead of maintaining all these images. In fact the number of images is now irrelevant because the overhead is bound independently of the number of images.

The cascading engine 110 limits overhead due to multiple point-in-time images for copy-on-write implementations. For example, if the target volumes are themselves going to be modified, additional changes are made. If a region of volume C 220 is modified, in order to maintain volume B 210, the cascading engine 110 first copies the corresponding region from volume D 230 (or volume A 200) and writes that data to volume B 210.

In certain embodiments, some target volumes are never or rarely modified and the underlying storage is fully allocated (i.e., not thin provisioned). In certain embodiments, the target volumes are thin provisioned to avoid "wasted" capacity, which allows users to avoid paying for capacity to hold data that never or rarely changes. Thin provisioned volumes may be described as consuming backend storage proportional to the amount of data that has been written to them. With the cascaded approach, seemingly independent images may affect the amount of capacity each images requires (e.g., when a target images undergoes considerable change). This effect is particularly apparent when the target images undergo considerable change during their lifetime.

The cascading engine 110 creates an intermediate map and an intermediate volume in order to remove dependency between target images. The intermediate map and the intermediate volume are associated with each other. With this approach, modifications to the target volume have no effect on other target volumes.

Merely to enhance understanding, an example will be provided. In this example, in response to receiving a request for an instant virtual copy from volume A 200 to volume B 210, when the cascading engine 110 starts map 1, the cascading engine 110 also creates intermediate map 1' and intermediate volume B' 410 defined by:

1:A→B
1':A→B'

This results in the following dependency chain:
A→B'→B

In this example, no writes have modified volume A 200 since map 1 was started, and, in response to receiving another request for an instant virtual copy from volume A 200 to volume C 220, the cascading engine 110 starts map 2:

2:A→C

In this case, the cascading engine 110 does not create another intermediate volume or intermediate map. Instead, the cascading engine 110 branches volume C 220 off of intermediate volume B' 410 such that the dependency chain is:

A→B'(→B,→C)

The portion of the dependency chain represented by (→B, →C) illustrates a fork of the intermediate volume B' 410 so that volume B 210 and volume C 220 are independent of each other and only depend on intermediate volume B' 410 and volume A 200.

Next, assume that volume A 200 is modified, and then the cascading engine 110, in response to receiving a request for an instant virtual copy from volume A 200 to volume D 230, starts map 3. In this case, the cascading engine creates an intermediate volume D' 420 and intermediate map 3' defined by:

3':A→D'

Figure 4:
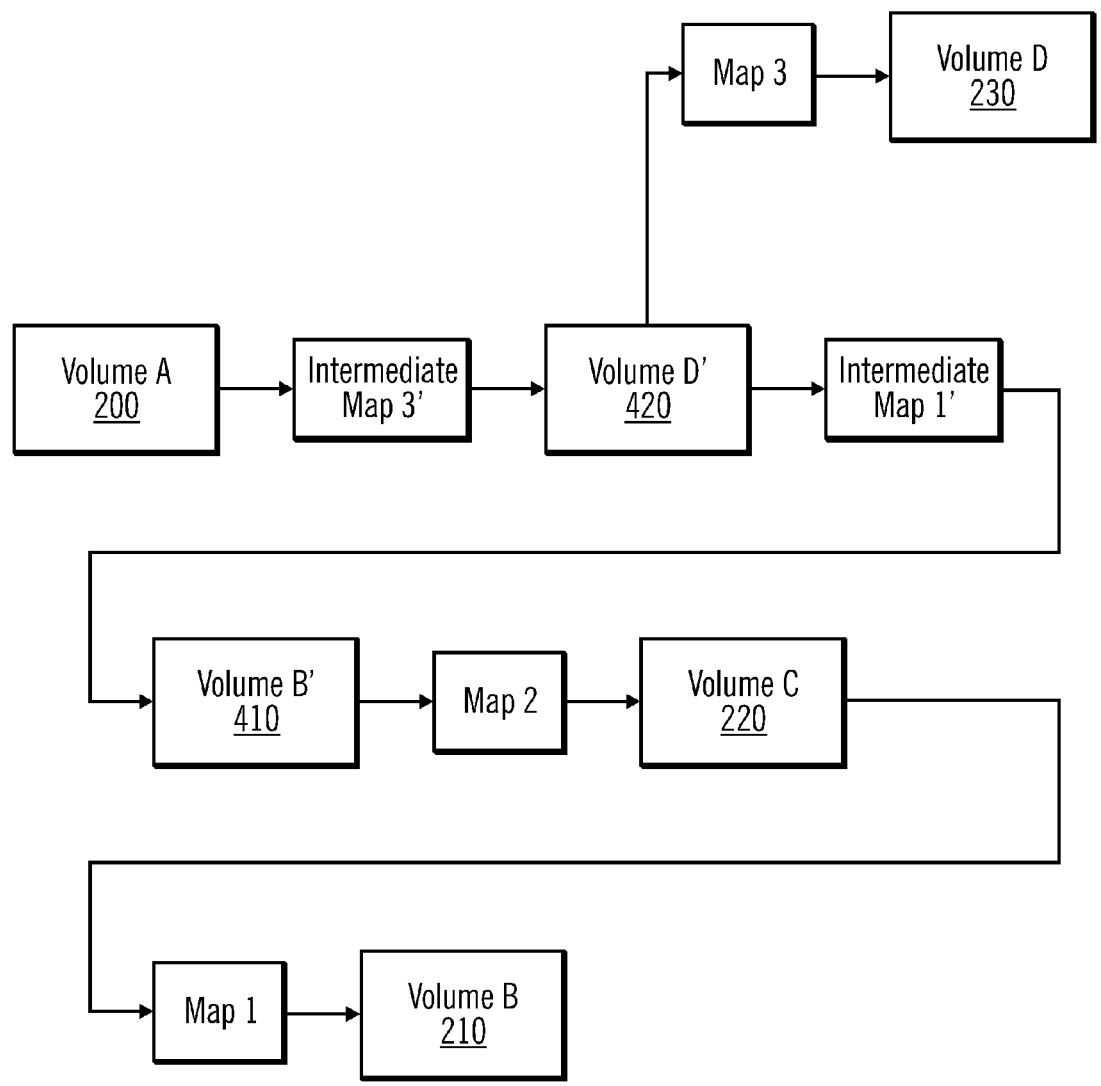
FIG. 4 illustrates, in a block diagram, an example of a cascade of storage volumes including intermediate volumes and intermediate maps in accordance with certain embodiments.

The following is the dependency chain, and FIG. 4 illustrates, in a block diagram, an example of the cascade of storage volumes including the intermediate volumes and the intermediate maps in accordance with certain embodiments for the following dependency chain:

A→D'(→D)→B'(→B,→C)

With the dependency chain having intermediate volumes and associated intermediate maps, a read of volume C 220 would find the data either on volume C 220, intermediate volume B' 410 or volume A 200. A read of volume B 210 would find the data on either volume B 210, intermediate volume B' 410 or volume A 200.

Intermediate volumes D' 420 and B' 410 are not written to and their purpose is to maintain data for volume D 230 and volumes C 220 and B 210, respectively. That is, if a write request is received for an intermediate volume, the write request is rejected.

Now, a write to volume D 230 has no effect on the data on volume B 210 or volume C 220. Similarly, a write to volume B 210 has no effect on the data on volume C 220 or volume D 230. Volumes B 210, C 220, and D 230 are independent of each other, and the data allocated on each of them is only the data written to that volume B 210, C 220 or D230.

It is possible that intermediate volume D' 420 holds data due to write to a region of volume A 200; volume D 230 holds data for the corresponding region; and volume B 210 and volume C 220 also hold data for the same corresponding region. In certain embodiments, a form of garbage collection is used to minimize the amount to capacity used because the data on the intermediate volume D' 420 is not needed. In this way, the cascading engine 110 ensures only the minimum amount of capacity is used to maintain the target images independent of the amount of target Input/Output (I/O) (i.e., read/write) activity.

Figure 5A:
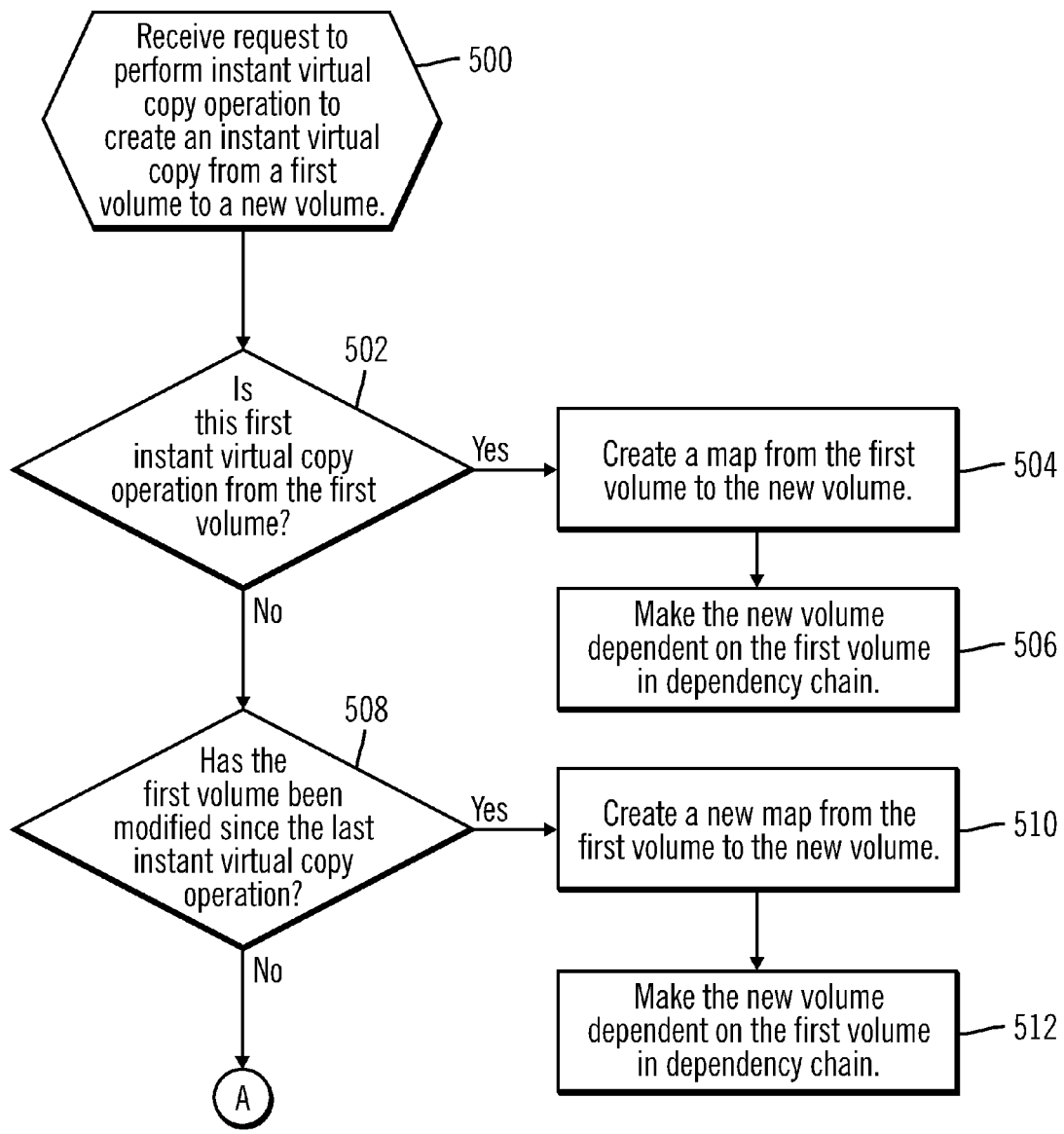
FIGS. 5A and 5B illustrate, in a flow diagram, processing performed by a cascading tool in accordance with certain embodiments.
Figure 5B:
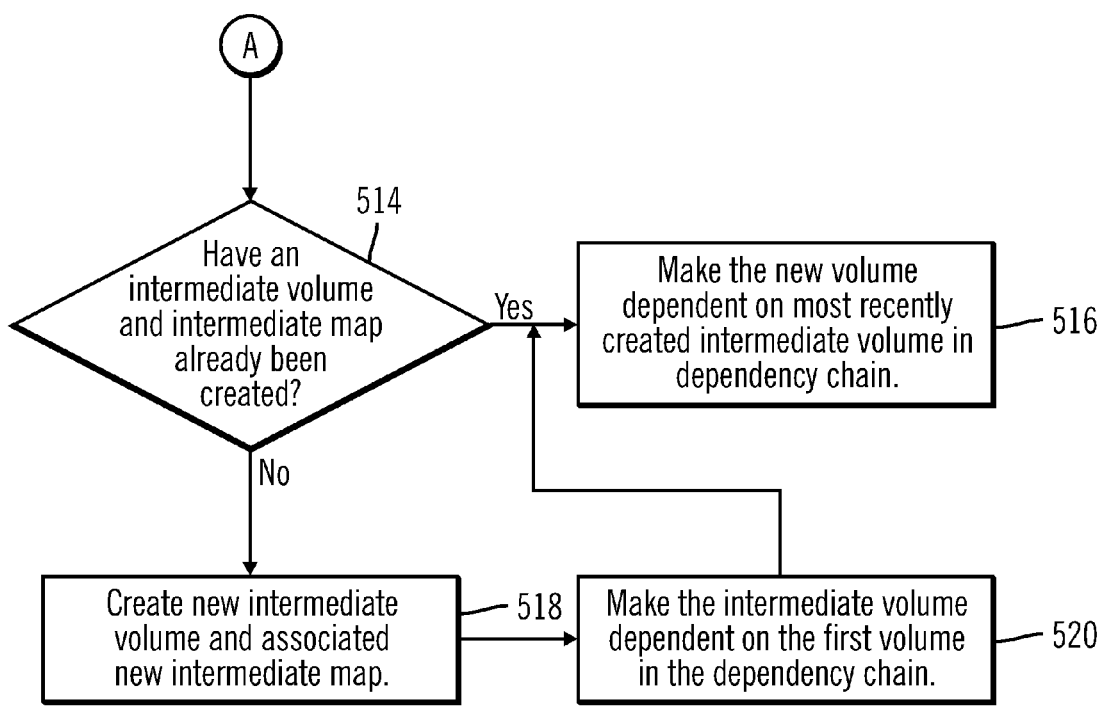

FIGS. 5A and 5B illustrate, in a flow diagram, processing performed by the cascading engine 110 in accordance with certain embodiments. Control begins at block 500 with the cascading engine 110 receiving a request to perform an instant virtual copy operation to create an instant virtual copy from a first volume to a new volume (e.g., from volume A 200 to volume B 210, from volume 200 A to volume C 220 or from volume A 200 to volume D 230).

In block 502, the cascading engine 110 determines whether this is the first instant virtual copy operation from the first volume (i.e., no other instant virtual copies have been made). If so, processing continues to block 504, otherwise, processing continues to block 508. In block 504, the cascading engine 110 creates a map from the first volume to the new volume. In block 506, the cascading engine 110 makes the new volume dependent on the first volume in dependency chain.

In block 508, the cascading engine 110 determines whether the first volume has been modified since the last instant virtual copy operation. If so, processing continues to block 510, otherwise, processing continues to block 514 (FIG. 5B). In block 510, the cascading engine 110 creates a map from the first volume to the new volume. In block 512, the cascading engine 110 makes the new volume dependent on the first volume in dependency chain.

In block 514, the cascading engine 110 determines whether an intermediate volume and intermediate map already been created. If so, processing continues to block 516, otherwise, processing continues to block 518.

In block 516, the cascading engine 110 makes the new volume dependent on the most recently created intermediate volume in the dependency chain.

In block 518, the cascading engine 110 creates a new intermediate volume and associated new intermediate map. In block 520, the cascading engine 110 makes the intermediate volume dependent on the first volume in the dependency chain. From block 520, processing continues to block 516.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Figure 6:
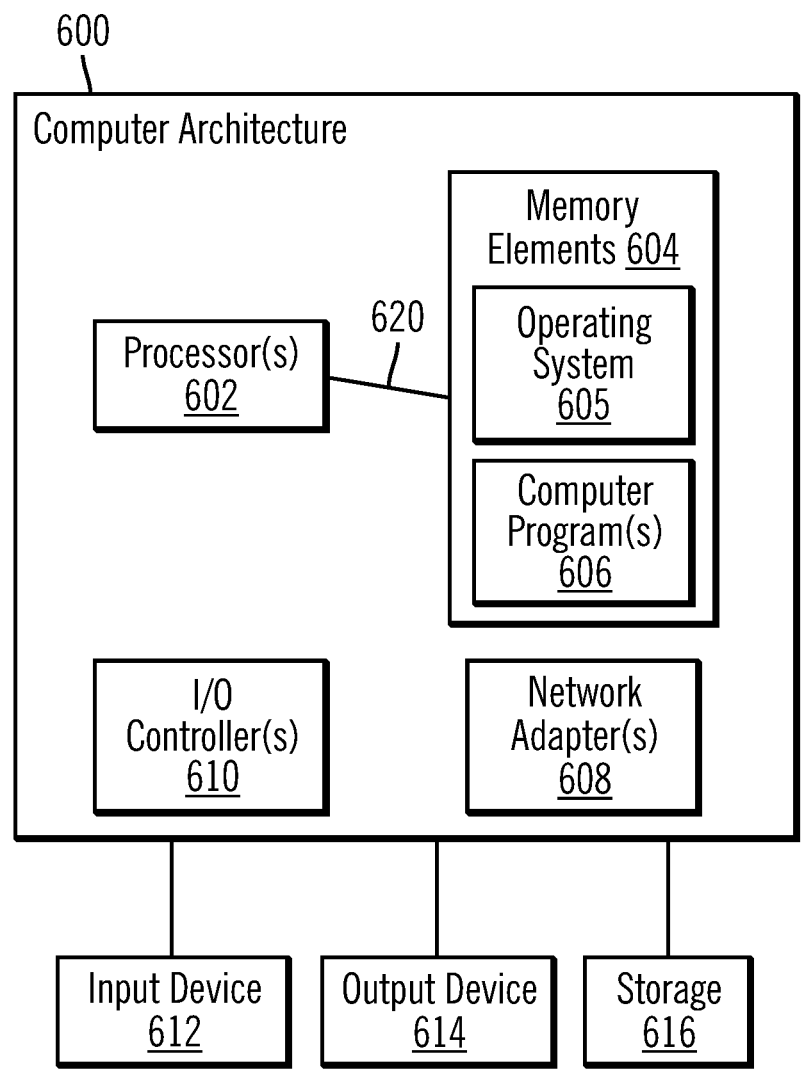
FIG. 6 illustrates, in a block diagram, a computer architecture that may be used in accordance with certain embodiments.

FIG. 6 illustrates a computer architecture 600 that may be used in accordance with certain embodiments. Storage controller 100 and/or production computers 150a,b, . . . k may implement computer architecture 600. The computer architecture 600 is suitable for storing and/or executing program code and includes at least one processor 602 coupled directly or indirectly to memory elements 604 through a system bus 620. The memory elements 604 may include local memory employed during actual execution of the program code, bulk storage, and cache memories which provide temporary storage of at least some program code in order to reduce the number of times code must be retrieved from bulk storage during execution. The memory elements 604 include an operating system 605 and one or more computer programs 606.

Input/Output (I/O) devices 612, 614 (including but not limited to keyboards, displays, pointing devices, etc.) may be coupled to the system either directly or through intervening I/O controllers 610.

Network adapters 608 may also be coupled to the system to enable the data processing system to become coupled to other data processing systems or remote printers or storage devices through intervening private or public networks. Modems, cable modem and Ethernet cards are just a few of the currently available types of network adapters 608.

The computer architecture 600 may be coupled to storage 616 (e.g., a non-volatile storage area, such as magnetic disk drives, optical disk drives, a tape drive, etc.). The storage 616 may comprise an internal storage device or an attached or network accessible storage. Computer programs 606 in storage 616 may be loaded into the memory elements 604 and executed by a processor 602 in a manner known in the art.

The computer architecture 600 may include fewer components than illustrated, additional components not illustrated herein, or some combination of the components illustrated and additional components. The computer architecture 600 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A computer system for maintaining instant virtual copies, comprising:
   a processor; and
   a storage device connected to the processor, wherein the storage device has stored thereon a program, and wherein the processor is configured to execute instructions of the program to perform operations, wherein the operations comprise:
   in response to receiving a request to perform an instant virtual copy operation to create an instant virtual copy from a first source volume to a first target volume,
      creating a first intermediate volume, a first intermediate map, and a first map for the first target volume;
      making the first intermediate volume dependent on the first source volume in a dependency chain based on the first intermediate map; and
      making the first target volume dependent on the first intermediate volume in the dependency chain based on the first map;
   receiving a request to perform another instant virtual copy operation to create an instant virtual copy from the first source volume to a second target volume;
   in response to determining that the first source volume has not been modified since a last instant virtual copy operation from the first source volume has been performed, making the second target volume dependent on the first intermediate volume in the dependency chain based on a second map; and
   in response to determining that the first source volume has been modified since a last instant virtual copy operation from the first source volume has been performed;
      creating a second intermediate volume, a second intermediate map, and a third map for the second target volume;
      making the second intermediate volume dependent on the first source volume in the dependency chain based on the second intermediate map; and
      making the second target volume dependent on the second intermediate volume in the dependency chain based on the third map.

2. The computer system of claim 1, wherein the operations further comprise:
   determining that the instant virtual copy operation is a first instant virtual copy operation from the first source volume to the first target volume.

3. The computer system of claim 1, wherein the operations further comprise:
   to determining that the first intermediate volume and the first intermediate map have already been created.

4. The computer system of claim 1, wherein the operations further comprise:
   receiving a read request for the second target volume that is dependent on the first intermediate volume; and
   attempting to obtain data for the read request from the second target volume, the first intermediate volume, and the first source volume, in that order.

5. The computer system of claim 1, wherein the first intermediate volume is not updated in response to write requests to the first intermediate volume.

6. The computer system of claim 1, and wherein the operations further comprise:
   receiving a request to perform another instant virtual copy operation to create another instant virtual copy from the first source volume to a third target volume;
   creating a third intermediate volume and a third intermediate map;
   making the third intermediate volume dependent on the first source volume in the dependency chain based on the third intermediate map; and
   making the third target volume dependent on the third intermediate volume in the dependency chain.

7. The computer system of claim 1, wherein an update of the second target volume does not affect data stored on the first target volume.

8. A computer program product for maintaining instant virtual copies, the computer program product comprising:
   a non-transitory computer readable storage medium having computer readable program code embodied therewith, wherein the computer readable program code, when executed by a processor of a computer, is configured to perform:
   in response to receiving a request to perform an instant virtual copy operation to create an instant virtual copy from a first source volume to a first target volume, creating a first intermediate volume, a first intermediate map, and a first map for the first target volume;
   making the first intermediate volume dependent on the first source volume in a dependency chain based on the intermediate map; and making the first target volume dependent on the first intermediate volume in a dependency chain based on the first map;
   receiving a request to perform another instant virtual copy operation to create an instant virtual copy from the first source volume to a second target volume; in response to determining that the first source volume has not been modified since a last instant virtual copy operation from the first source volume has been performed, making the second target volume dependent on the first intermediate volume in the dependency chain based on a second map; and in response to determining that the first source volume has been modified since a last instant virtual copy operation from the first source volume has been performed; creating a second intermediate volume, a second intermediate map, and a third map for the second target volume; making the second intermediate volume dependent on the first source volume in the dependency chain based on the second intermediate map; and making the second target volume dependent on the second intermediate volume in the dependency chain based on the third map.

9. The computer program product of claim 8, wherein the computer readable program code, when executed by the processor of the computer, is configured to perform:
   determining that the instant virtual copy operation is a first instant virtual copy operation from the first source volume to the first target volume.

10. The computer program product of claim 8, wherein the computer readable program code, when executed by the processor of the computer, is configured to perform:
   determining that the first intermediate volume and the first intermediate map have already been created.

11. The computer program product of claim 8, wherein the computer readable program code, when executed by the processor of the computer, is configured to perform:
   receiving a read request for the second target volume that is dependent on the first intermediate volume; and
   attempting to obtain data for the read request from the second target volume, the first intermediate volume, and the first source volume, in that order.

12. The computer program product of claim 8, wherein the first intermediate volume is not updated in response to write requests to the first intermediate volume.

13. The computer program product of claim 8, wherein the computer readable program code, when executed by the processor of the computer, is configured to perform:
   receiving a request to perform another instant virtual copy operation to create another instant virtual copy from the first source volume to a third target volume;
   creating a third intermediate volume and a third intermediate map;
   making the third intermediate volume dependent on the first source volume in the dependency chain based on the third intermediate map; and
   making the third target volume dependent on the third intermediate volume in the dependency chain.

14. The computer program product of claim 8, wherein an update of the second target volume does not affect data stored on the first target volume.

* * * * *